US008189596B2

(12) United States Patent
Räsänen

(10) Patent No.: US 8,189,596 B2
(45) Date of Patent: May 29, 2012

(54) METHOD FOR THE MAPPING OF PACKET FLOWS TO BEARERS IN A COMMUNICATION SYSTEM

(75) Inventor: Juha Räsänen, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 1562 days.

(21) Appl. No.: 11/391,254

(22) Filed: Mar. 29, 2006

(65) Prior Publication Data

US 2007/0147244 A1   Jun. 28, 2007

(30) Foreign Application Priority Data

Dec. 22, 2005 (FI) .................................. 20051320

(51) Int. Cl.
*H04L 12/56* (2006.01)
(52) U.S. Cl. ................................. 370/395.21
(58) Field of Classification Search ................. 370/229, 370/230.1, 232–236, 310, 328, 342, 343, 370/351, 395.21, 400, 401, 480, 498
See application file for complete search history.

(56) References Cited

U.S. PATENT DOCUMENTS

| 6,571,101 | B1 * | 5/2003 | Schulz ........................ 455/450 |
| 7,301,905 | B1 * | 11/2007 | Tontiruttananon et al. ... 370/232 |
| 2002/0036983 | A1 * | 3/2002 | Widegren et al. ......... 370/230.1 |
| 2002/0120749 | A1 | 8/2002 | Widegren et al. |
| 2002/0128017 | A1 * | 9/2002 | Virtanen ........................ 455/452 |
| 2003/0009580 | A1 * | 1/2003 | Chen et al. .................... 709/231 |
| 2004/0125748 | A1 | 7/2004 | Hurtta et al. |
| 2004/0190453 | A1 * | 9/2004 | Rasanen et al. .............. 370/235 |
| 2004/0223489 | A1 * | 11/2004 | Rotsten et al. ............... 370/352 |
| 2005/0094560 | A1 * | 5/2005 | Montes Linares ........... 370/230 |
| 2006/0002333 | A1 * | 1/2006 | Skog et al. ................... 370/328 |
| 2006/0045069 | A1 * | 3/2006 | Zehavi et al. ................ 370/352 |

FOREIGN PATENT DOCUMENTS

WO   WO 2004/071105   8/2004

OTHER PUBLICATIONS

International Search Report PCT/FI2006/000419 filed Dec. 21, 2006.

* cited by examiner

*Primary Examiner* — Chi Pham
*Assistant Examiner* — Curtis A Alia
(74) *Attorney, Agent, or Firm* — Squire Sanders (US) LLP

(57) ABSTRACT

The invention relates to a method for the mapping of packet flows onto bearers in a communication system. The establishment of a session between a terminal and a remote terminal is initiated. Information on the session and packet flows associated with it is received to a second network node. A first network node obtains from the second network node one or two packet classifiers for each of the packet flows. At least a first bearer belonging to the bearers is established between the terminal and the first network node. A packet associated with the first bearer is received in the first network node. The packet is matched with the one or two packet classifiers associated with each of the packet flows to determine a first packet flow among the packet flows. A mapping is established between the first packet flow and the first bearer in the first network node.

37 Claims, 6 Drawing Sheets

METHOD FOR THE MAPPING OF PACKET FLOWS TO BEARERS IN A COMMUNICATION SYSTEM

BACKGROUND OF THE INVENTION

1. Field of the Invention

The invention relates to Quality of Service (QoS) in packet switched communication systems. Admission control is applied for packet flows, which are transmitted using bearers. Particularly, the invention relates to a method for the mapping of packet flows to bearers in a communication system.

2. Description of the Related Art

The transport of voice and multimedia over packet switched networks has in the recent years emerged as a viable alternative for traditional circuit switched networks. In circuit switched networks resource allocation is based on the allocation of entire physical circuits or repeating timeslots within physical circuits for users. From an abstract point of view the transport technology relieves the network of the complexity involving admission control and Quality of Service (QoS) allocation. In packet switched networks the transport technology inherently does not provide the users with guarantees involving the QoS available for a single user. QoS is observed in terms of such properties as, for example, data rate, delay, the variation of delay and bit error probability. These properties are usually referred to as QoS parameters. The users must be guaranteed certain QoS parameters. However, other users must also be taken into consideration before granting given QoS parameters for a given new user. In other words, it must be ensured that the capacity of the system is not exceeded when implementing the new users QoS requirements in the system. The QoS guarantees already committed to must be sustained. It must be checked that the increase in the use of a variety of resources such as packet queues in network nodes, network node packet switching capacity and transmission line capacity does not cause a relaxation from already guaranteed parameters such as maximum delays and data rates.

In order to control the access of new users to network resources admission control is applied. In packet switched networks admission control entities have been introduced to control access to network resources. The admission control entities are interfaced by users or by network nodes on behalf of users in order to perform QoS allocation for users. Admission control may be performed in small scale for individual users or for flows originated by individual users. In larger scale admission control may be performed for entire networks at the edge of a large core network by determining that the networks adhere to predefined service level agreements. Examples of technologies for the implementation of QoS in Internet Protocol (IP) networks include Integrated Services (IntServ) and Differentiated Services (DiffServ) defined in the Internet Engineering Task Force (IETF) documents RFC 2210 and RFC 2475, respectively. Yet another standard for the QoS is the Multi Label Protocol Switching (MPLS) defined in IETF document RFC 3032. In the Common Open Policy Services (COPS) framework defined in the IETF document RFC 2753, the admission control decisions are centralized to a Policy Decision Point (PDP), which makes decisions whether to admit a certain flow or set of flows to the network on behalf of a Policy Enforcement Point (PEP). The PEP is in practice a router or a network edge node. When receiving an allocation request for a flow, the PEP contacts the PDP. The PDP returns a policy decision to the PEP, which in effect tells whether the flow should be admitted or denied. The QoS parameters may entirely be provided from the PDP or simply modified by the PDP. The information regarding a flow or a set of flows is obtained to a PEP, for example, via the Resource Reservation Protocol (RSVP) defined in the IETF document RFC 2205.

In the Universal Mobile Telecommunications System (UMTS) the Common Open Policy Services protocol defined in the IETF document RFC 2748 is used to determine QoS parameters for Packet Data Protocol (PDP) contexts based on at least one set of binding information provided from a Mobile Station (MS). Each such set of binding information consists of an authorization token and a number of flow identifiers. The authorization token provides the Fully Qualified Domain Name (FQDN) of a Policy Decision Point (PDP) and a unique session identifier within the PDP. The flow identifiers identify uniquely either a single IP flow or a bi-directional combination of two IP flows associated with the session.

Reference is now made to FIG. 1, which illustrates a Universal Mobile Telecommunications System (UMTS) in prior art. In FIG. 1 there is shown a mobile station 100, which communicates with a Radio Network Controller (RNC) 114 within a Radio Access Network 110. The communication occurs via a Base Transceiver Station (BTS) 112. The radio access network 110 is, for example, a 2G GSM/EDGE radio access network or a 3G UMTS radio access network. An IP Connectivity Access Network (IP-CAN) functionality (not shown) connected to access network 110 comprises at least a Serving GPRS Support Node (SGSN) 122 and a Gateway GPRS Support Node (GGSN) 124. The functionality of the IP-CAN is disclosed in the 3G Partnership Project specification 23.060. SGSN 122 performs all mobility management related tasks and communicates with a Home Subscriber Server (HSS) 160 in order to obtain subscriber information. GGSN 124 provides GPRS access points. There are access points, for example, to a Media Gateway (MGW) 126, to a first router 142 attached to an IP network 140 and to a Proxy Call State Control Function (P-CSCF) 152. The access point for P-CSCF 152 is used to convey signaling traffic. GGSN 124 establishes Packet Data Protocol (PDP) contexts, which are control records associated with a mobile subscriber such as mobile station 100. A PDP context provides an IP address for packets received from or sent to mobile station 100. A PDP context has also associated with it a UMTS bearer providing a certain QoS for mobile station 100. In GGSN 124 there is a primary PDP context for the signaling packets associated mobile station 100. For the user plane data packets carrying at least one IP flow there is established at least one secondary PDP context. The at least one IP flow is established between a calling terminal and a called terminal in association with an IP multimedia session. An IP flow carries a multimedia component such as a voice or a video stream in one direction. For voice calls at least two IP flows are required, one for the direction from the calling terminal to the called terminal and one for the reverse direction. In this case an IP flow is defined as a quintuple consisting of a source port, a source address, a destination address, a destination port and a protocol identifier.

The communication system illustrated in FIG. 1 comprises also the IP Multimedia Subsystem (IMS) functionality. The IMS is used to set-up multimedia sessions over IP-CAN. The network elements supporting IMS comprise at least one Proxy Call State Control Function (P-CSCF), at least one Inquiring Call State Control Function (I-CSCF), at least one Serving Call State Control Function S-CSCF, at least one Brakeout Gateway Control Function (BGCF) and at least one Media Gateway Control Function (MGCF). As part of the IMS there is also at least one Home Subscriber Server (HSS). Optionally, there is also at least one Application Server, which provides a variety of value-added services for mobile subscribers served by the IP multimedia subsystem (IMS). The IMS is disclosed in the 3G Partnership Project (3GPP) specification 23.228. P-CSCF 152 receives signaling plane packets from GGSN 124.

The P-CSCF usually comprises a Policy Decision Function (PDF), which corresponds to a Policy Decision Point (PDP) familiar from the COPS framework. The PDF may also be implemented as a separate PDP, which communicates with the P-CSCF. Without the authorization from the P-CSCF, a primary PDP context is opened in GGSN 124. Via the primary PDP context are sent signaling plane packets used to set-up a session between mobile station 100 and a called party terminal (TE) 146. In the signaling plane packets are carried Session Initiation Protocol (SIP) signaling messages. The Session Initiation Protocol (SIP) is disclosed in the Internet Engineering Task Force (IETF) document RFC 3261. The signaling message is processed by P-CSCF 152, which determines the correct serving network for the mobile station 100 that sent the signaling packet. The determination of the correct serving network is based on a home domain name provided from mobile station 100. Based on the home domain name is determined the correct I-CSCF, which in FIG. 1 is I-CSCF 154. I-CSCF 154 hides the topology of the serving network from the networks, in which mobile station 100 happens to be roaming. I-CSCF 154 takes contact to home subscriber server 160, which returns the name of the S-CSCF, which is used to determine the address of S-CSCF 156 to which the mobile station 100 is to be registered. If I-CSCF 156 must select a new S-CSCF for mobile station 100, home subscriber server 160 returns required S-CSCF capabilities for S-CSCF selection. Upon receiving a registration, S-CSCF 156 obtains information pertaining to mobile station 100 from HSS 160. The information returned from HSS 160 may comprise trigger information that is used as criterion for notifying an application server 162. Application server 162 may be notified on events relating to incoming registrations or incoming session initiations. Application server 162 communicates with S-CSCF 156 using the ISC-interface. The acronym ISC stands for IP multimedia subsystem Service Control interface. The ISC interface is disclosed in the 3GPP specification 23.228. The protocol used on ISC interface is SIP. AS 162 may alter SIP invite message contents that it receives from S-CSCF 156. The modified SIP invite message is returned back to S-CSCF 156.

If the session to be initiated is targeted to a PSTN subscriber or a circuit switched network subscriber, the SIP invite message is forwarded to a BGCF 158. BGCF 158 determines the network in which interworking to PSTN or the circuit switched network should be performed. In case PSTN interworking is to be performed in the current network, the SIP invite message is forwarded to MGCF 159 from BGCF 158. MGCF 159 communicates with MGW 126. The user plane packets carrying a media bearer or a number of interrelated media bearers for the session are routed from GGSN 124 to MGW 126 as illustrated in FIG. 1.

If the session to be initiated is targeted to terminal 146, which is a pure IP terminal, S-CSCF 156 forwards the SIP Invite message to terminal 146. Terminal 146 communicates with a second router 144, which interfaces IP network 140. IP network 140 is used to carry the user plane IP flows associated with the session established between mobile station 100 and terminal 146. The user plane IP flows between first router 142 and GGSN 124 are illustrated with line 128. The user plane IP flows between second router 144 and terminal 146 are illustrated with line 148.

In order to allocate the end-to-end QoS required for the user plane IP flows between mobile station 100 and terminal 146, the GGSN 124 provides to a PDF within P-CSCF 152 at least one set of binding information provided from a mobile station 100. The sets of binding information have been formed in the PDF within P-CSCF 152 in response to SIP signaling and the Session Description Protocol (SDP) definitions carried in the SIP signaling messages. In order to form a set of binding information, the PDF has allocated a unique identifier for a session to be established and has assigned unique flow identifiers for each IP flow or each bi-directional combination of two IP flows observed in the SDP definitions. The unique identifier together with the PDF FQDN is used to form an authorization token for the session in the PDF. The authorization token is returned to mobile station 100 as binding information. There may be other authorization tokens for other parallel sessions. Mobile station 100 also assigns unique flow identifiers for each IP flow or each bi-directional combination of two IP flows observed in the SDP definitions in the same way as the PDF.

The mobile station 100 sends the binding information, that is to say, the authorization token and the flow identifiers of the IP flows or bi-directional IP flow combinations to be set up, to the GGSN 124 upon the secondary PDP context establishment. The GGSN 124 sends the binding information to the PDF in an authorization request. In response to the sets of binding information, the PDF returns the QoS information for the IP flows identified in the sets of binding information. The QoS information is used to establish a UMTS bearer between GGSN 124 and mobile station 100. The QoS information is also used to establish an external bearer between GGSN 124 and terminal 146. The UMTS bearer is established using signaling towards SGSN 122 and from there to RNC 114. The UMTS bearer comprises a radio access bearer and a core network bearer. The external bearer is established from GGSN 124 either explicitly using RSVP signaling or implicitly by assigning the user plane packets associated with an IP flow a certain Differentiated Service Code Point (DSCP).

Reference is now made to FIG. 2, which illustrates a binding mechanism in association with the QoS authorization for Packet Data Protocol (PDP) contexts in prior art. In FIG. 2 there is illustrated a mobile station 100 and a GGSN 124. There is also a P-CSCF 152 and a PDF 220. The PDF 220 may be part of P-CSCF 152. Within mobile station 100 there is a SIP client entity 208. SIP client entity 208 takes care of all SIP signaling related tasks. It establishes a SIP session between mobile station 100 and a remote terminal (not shown). SIP signaling messages are exchanged between mobile station 100 and a remote terminal via P-CSCF 152. Within a SIP invite message and the associated response messages there is carried a Session Description Protocol (SDP) definition, which defines the properties of the media components that are part of the multimedia session. Each media components is represented in the packet traffic an IP flow or bi-directional combination of two IP flows. When the P-CSCF 152 receives a session description protocol definition, it checks the media components defined therein. It assigns flow identifiers to represent the media components. For the SIP session the P-CSCF 152 allocates a unique session identifier. The FQDN of P-CSCF 152 is combined together with the unique session identifier in order to determine an authorization token, which is returned from P-CSCF 152 to mobile station 100 in a SIP response message.

In mobile station 100 there is also an IP Bearer Service Manager 206. IP Bearer Service Manager 206 provides the IP level QoS parameters via a Translation/Mapping manager 204 to a UMTS Bearer Service Manager 202. In GGSN 124 there is also an IP Bearer Service Manager 216. IP Bearer Service Manager 216 provides the IP level QoS parameters to a UMTS Bearer Service Manager 212 via a Translation/Mapping Manager 214. There is also a Policy Enforcement Entity 218, which is a function within the GGSN 124. In FIG. 2 there are shown within GGSN 124 two packet data protocol contexts, namely PDP1 and PDPn. These packet data protocol contexts are secondary PDP contexts. In FIG. 2 there are at least four IP flows. There is a flow F11 and a flow F1p. There are also flows Fn1 and Fnm. The letter n indicates that theoretically there may be any integer number of secondary PDP contexts, which are active in GGSN 124 for mobile station 100. Associated with PDP1 there may be an integer number of flows numbered from 1 to p. Associated with PDPn there may be any integer number of flows numbered from 1 to m. In response to QoS parameters authorized by PDF 220, Translation/Mapping Manager 214 translates the authorized QoS parameters on IP level to UMTS Bearer Service Parameters. The IP level QoS parameters include at least maximum bit rate and maximum QoS class. UMTS Bearer Service Manager maps the maximum bit rate values for appropriate corresponding parameters for the Radio Bearer and for the Radio Access Bearer. Similarly, the QoS class is translated into a number of parameters, which define, for example, the allowed delay variation and bit error rate.

Reference is now made to FIG. 3, which illustrates Quality of Service (QoS) authorization signaling in prior art. In FIG. 3 there is a PDF 220, a GGSN 124, which comprises an IP Bearer Service Manager 216, a Translation/Mapping Manager 214 and a UMTS Bearer Service Manager 212. These functions are similar to the ones illustrated in association with FIG. 2. With GGSN 124 communicates a mobile station such as mobile station 100 (not shown). The starting point in FIG. 3 is that between a mobile station and a remote terminal there have been exchanged SIP signaling messages. The mobile station communicating with GGSN 124 has obtained binding information comprising at least two authorization tokens pertaining to two PDP contexts in signaling information. The authorization tokens are provided to mobile station from PDF 220 via a P-CSCF. As illustrated with arrow 301, the mobile station sends a PDP context activation request to GGSN 124. The PDP context activation comprises binding information, which consists of authorization token T1, flow identifiers F11 to F1p and QoS information. The QoS information comprises a traffic class and maximum bitrates for uplink and downlink directions as specified in 3GPP specification 24.008. In response to the PDP context activation, Policy Enforcement Point 216 sends the authorization token T1 and flow identifiers F11 to F1p in a COPS Authorization Request message to PDF 220, as illustrated with arrow 302.

In response to COPS Authorization Request message 302 PDF 220 provides a decision message comprising a COPS Install command to GGSN 124. The COPS Install command, which is generally used to authorize QoS, contains the policy information associated with IP flows F11 to F1p. The contents of the Install command are specified in the 3GPP specification 29.207. Associated with each secondary PDP context there are two unidirectional sets. A unidirectional set is provided for uplink and downlink directions separately. A unidirectional set comprises a direction indicator indicating uplink or downlink, a packet classifier and authorized QoS information. For each IP flow or a bundle of unidirectional IP flows there is a gate description and a gate status, that is, a packet handling action. The gate description comprises a packet classifier, in other words, a filter specification. The packet classifier includes a standard quintuple, which comprises a source IP address, a destination IP address, a source port, destination ports and a protocol identifier. The parameters of the packet classifier identify a sequence of packets associated with an IP flow or a bundle of unidirectional IP flows. The source and destination ports are described with a range consisting of a minimum and maximum value. If only one port is authorized, the minimum and maximum value of the range are identical. A filter specification describing more than one IP flow, that is, a bundle of unidirectional IP flows shall be only used in the case of identical protocol identifiers, IP addresses and successive port numbers. This occurs, for example, in the case of interrelated Real-Time Protocol (RTP) and Real-Time Control Protocol (RTCP) flows of a media component. The RTP and the RTCP are specified in the IETF document RFC 1889. For a bi-directional combination of two IP flows there are two gate descriptions, one for the uplink IP flow and one for the downlink IP flow. Separate from the unidirectional sets there is provided charging information for charging correlation between the IP-CAN and the IMS. The charging information is used to associate charging records generated from GGSN 124 to charging records generated in the IP multimedia subsystem side.

Authorized QoS information provides an upper bound on the resources that can be allocated for the combined set of IP flows, which are associated with the PDP context in the respective direction. The authorized QoS information contains a maximum QoS class and a data rate parameter. The maximum QoS class is used to identify the maximum allowed traffic class in UMTS. The packet handling action defines the packet handling that must be accorded to packets matching the packet classifier. The packet handling action results in the packets matching the classifier either being passed or silently discarded. Policy enforcement point 216 also verifies that the traffic class and maximum bitrate parameters provided in PDP context activation message 301 do not exceed the maximum QoS class or data rate parameters within the authorized QoS information. The traffic class and maximum bitrate parameters are specified in the 3GPP specification 24.008. Policy enforcement point 216 activates secondary PDP context PDP1 in response to the COPS Install command. PDP context PDP shall contain the flows F11 to flow F1p. PDP context activation is also acknowledged to the mobile station.

The mobile station activates also a second secondary PDP context as illustrated with arrow 305. The secondary PDP context activation contains authorization token Tn and associated flow identifiers Fn1 to Fnm. In response to the receiving of PDP context activation Policy Enforcement Point 216 sends an authorization request message to PDF 220, as illustrated with arrow 306. The request message contains a set of binding information. The set of binding information comprises authorization token Tn and flow identifiers Fn1 to Fnm. In response to the request message PDF 220 provides a decision message comprising a COPS Install command to GGSN 124 as illustrated with arrow 307. The install command provides gate descriptions comprising packet classifiers for each of the IP flows from Fn1 to Fnm. In response to the COPS Install command PDP context PDPn is activated within GGSN 124. PDP context PDPn shall contain the flows from Fn1 to Fnm. The PDP context activation is acknowledged to the mobile station.

The problem in prior art solutions is that it is limited to using a binding mechanism based on an authorization token and flow identifiers. Possible new binding mechanisms, which only support the providing of an IP Address or a user identity to a PDF, do not support the separation of the PDP contexts. If the same mobile station uses more than one secondary PDP context controlled by Service Based Local Policy (SBLP) disclosed in association with FIGS. 2 and 3, only the mobile station, in other words, a User Equipment (UE) knows, which flows are multiplexed in a given PDP context and which in other PDP contexts. This means that the PDF authorizing the sessions of the mobile station cannot authorize the relevant QoS values for each PDP context. The PDF can only authorize all sessions of the mobile station aggregately for all PDP contexts. In practice this means that all PDP contexts have as authorized values: As bit rate the sum of the bit rates of all sessions, as packet filters all filters of the sessions of the mobile station, as QoS class the maximum class amongst the sessions of the mobile station.

This causes several practical problems. For example, the mobile station may exceed the authorized bitrate, which results in the waste of network resources and bandwidth. Further, downlink packets have to be sent through all SBLP controlled PDP contexts, because the network does not know which context the mobile station is using for given media flows, which results into the waste of resources and a risk of jamming the traffic channel. Further, the mobile station may exceed the QoS class in some PDP contexts, which also amounts to waste of network resources and bandwidth.

SUMMARY OF THE INVENTION

The invention relates to a method for the mapping of at least two packet flows onto at least two bearers in a communication system comprising at least a terminal, a first network node and a second network node. The method comprises: initiating the establishment of a session between said terminal and a remote terminal; receiving information on said session and said at least two packet flows in said second network node; agreeing the establishment of said at least two bearers between said terminal and said first network node; said first network node obtaining from said second network node a packet classifier for each said at least two packet flows; establishing at least a first bearer belonging to said at least two bearers; receiving a packet associated with said first bearer in said first network node; matching said packet with at least one of said packet classifiers to determine a first packet flow among said at least two packet flows; and establishing a mapping between a packet flow pair, said packet flow pair comprising said first packet flow and a corresponding opposite direction packet flow, and said first bearer in said first network node.

The invention relates also to a system for the mapping of at least two packet flows onto at least two bearers comprising: a terminal configured to initiate the establishment of a session with a remote terminal, to agree the establishment of said at least two bearers with a first network node, to establish at least a first bearer belonging to said at least two bearers; a first network node configured to agree the establishment of said at least two bearers with said terminal, to obtain a packet classifier for each said at least two packet flows, to establish at least a first bearer belonging to said at least two bearers, to receive a packet associated with said first bearer, to match said packet with at least one of said packet classifiers to determine a first packet flow among said at least two packet flows and to establish a mapping between a packet flow pair, said packet flow pair comprising said first packet flow and a corresponding opposite direction packet flow, and said first bearer; a second network node configured to receive information on said session and said at least two packet flows, to provide a packet classifier for each said at least two packet flows.

The invention relates also to a network node for the mapping of at least two packet flows onto at least two bearers comprising: a policy enforcement function configured to agree the establishment of said at least two bearers with said terminal, to obtain a packet classifier for each said at least two packet flows, to establish at least a first bearer belonging to said at least two bearers, to receive a packet associated with said first bearer, to match said packet with at least one of said packet classifiers to determine a first packet flow among said at least two packet flows and to establish a mapping between a packet flow pair, said packet flow pair comprising said first packet flow and a corresponding opposite direction packet flow, and said first bearer.

The invention relates also to a computer program comprising code adapted to perform the following steps when executed on a data-processing system: agreeing the establishment of said at least two bearers with a terminal; receiving a packet classifier for each of at least two packet flows; establishing at least a first bearer belonging to said at least two bearers; receiving a packet associated with said first bearer; matching said packet with at least one of said packet classifiers to determine a first packet flow among said at least two packet flows; and establishing a mapping between a packet flow pair, said packet flow pair comprising said first packet flow and a corresponding opposite direction packet flow, and said first bearer.

In one embodiment of the invention, in case of a bi-directional combination of two IP flows, for example, associated with a given media component such as audio, video or application data, the corresponding opposite direction packet for an IP flow is the other IP flow in the bi-directional combination.

In one embodiment of the invention, the policy enforcement entity in the first network node removes the packet classifiers associated with the packet flows in the packet flow pair from at least one second bearer among the at least two bearers, said at least one second bearer being different from said first bearer. The policy enforcement entity thus removes the packet classifiers associated with the flows in the flow pair, for which the mapping is established from other bearers.

In one embodiment of the invention, the terminal provides to the policy enforcement entity in the first network node a requested uplink bitrate and a requested downlink bitrate for a third bearer among said at least two bearers. The second network node providing a maximum bitrate for each said at least two packet flows to said first network node. The policy enforcement entity in the first network node sums for said third bearer among said at least two bearers the maximum bitrates of the uplink packet flows in the packet flow pairs mapped to said third bearer to obtain an uplink combined bitrate. Similarly, policy enforcement entity in the first network node sums for a third bearer among said at least two bearers the maximum bitrates of the downlink packet flows in the packet flow pairs mapped to said third bearer to obtain an downlink combined bitrate. Thereupon, the policy enforcement entity in the first network node compares said uplink combined bitrate to said requested uplink bitrate and said downlink combined bitrate to said requested downlink bitrate. The policy enforcement entity may remove said third bearer, in case said requested uplink bitrate exceeds said uplink combined bitrate or said requested downlink bitrate exceeds said downlink combined bitrate. The policy enforcement entity may also downgrade the downlink or uplink bitrates of said third bearer in the case of exceeding.

In one embodiment of the invention, said terminal provides to said first network node a requested quality of service class for a third bearer among said at least two bearers. The second network nodes provides a maximum quality of service class for each said at least two packet flows to the policy enforcement entity within said first network node. Thereupon, the policy enforcement entity checks that the requested quality of service class does not exceed any of the maximum quality of service classes provided for said third bearer.

In one embodiment of the invention, if the requested quality of service class exceeds any of the maximum quality of service classes provided for said third bearer, the policy enforcement entity may remove the third bearer or it may downgrade the quality of service class of said third bearer.

In one embodiment of the invention, the quality of service class comprises, for example, a conversational class, a streaming class, an interactive class and a background class.

In one embodiment of the invention, said policy enforcement entity in the first network node obtains from said second network node a first service class for each said at least two packet flows and determines a second service class for each said at least two bearers based on said mapping and said first service classes. The service class for a bearer is obtained by choosing the highest service class for a packet flow mapped to the bearer. By highest service class is meant, for example, the one providing the shortest delay.

In one embodiment of the invention, the policy enforcement entity in the first network node obtains from said second network node a first data rate associated with a combination of said at least two packet flows. In other words, the first data rate is the sum of the data rates of the packet flows. The policy enforcement entity compares the sum of the data rates of said at least two bearers to said first data rate. Thereupon, in case the sum of the data rates of said at least two bearers exceeds said first data rate, the policy entity reduces the data rate of at least one bearer among said at least two bearers.

In one embodiment of the invention, a third network node receives said information on said session and said at least two packet flows in at least one session establishment signaling message and provides said information on said session and said at least two packet flows to a second network node. In one embodiment of the invention, the third network node comprises a Session Initiation Protocol (SIP) proxy.

In one embodiment of the invention, the first network node comprises a network router, for example, an IP router. The first network node may also be an ATM packet switch or a Synchronous Digital Hierarchy (SDH) packet switch. The first network node may also be a link layer packet switch.

In one embodiment of the invention, said communication system comprises a mobile communication network. In one embodiment of the invention, said terminal comprises a mobile station or generally a mobile terminal.

In one embodiment of the invention, said first network node comprises a Gateway GPRS Support Node.

In one embodiment of the invention, said at least two bearers are Packet Data Protocol (PDP) Contexts.

In one embodiment of the invention, said second network node comprises a policy decision point in accordance with the IETF policy framework.

In one embodiment of the invention, the establishing at least one bearer between the terminal and the first network node further comprises the establishing of at least one connection segment to a connected state, said at least one connection segment belonging to at least two connection segments providing said at least one bearer. To the at least two connection segments belong, for example, a radio connection segment and a radio access connection segment. By a bearer, to which flows are mapped, in this context is meant a logical association between two network nodes, for which a certain quality of service is agreed at least preliminarily. The logical association may traverse a number of intermediate network elements such as a Serving GPRS support Node (SGSN) and a Radio Network Controller (RNC). Between neighboring intermediate network elements in the path of the logical association there is a connection segment. A bottleneck connection segment may not always be in an active state and may not have allocated resources associated with it. For example, a radio connection between a mobile station and the radio network is only established when there are packets to be transmitted in either uplink or downlink direction.

In one embodiment of the invention, the communication system comprises at least one of a Global System of Mobile Communications (GSM) network and a Universal Mobile Telephone System (UMTS) network. The mobile station may be, for example, a GSM mobile station or a UMTS mobile station.

In one embodiment of the invention, the third network node belongs to the IP Multimedia Subsystem (IMS) Call State Control Functions (CSCF).

In one embodiment of the invention, the computer program is stored on a computer readable medium. The computer readable medium may be a removable memory card, magnetic disk, optical disk or magnetic tape.

The benefits of the invention are related to the optimizing of the use of network resources.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
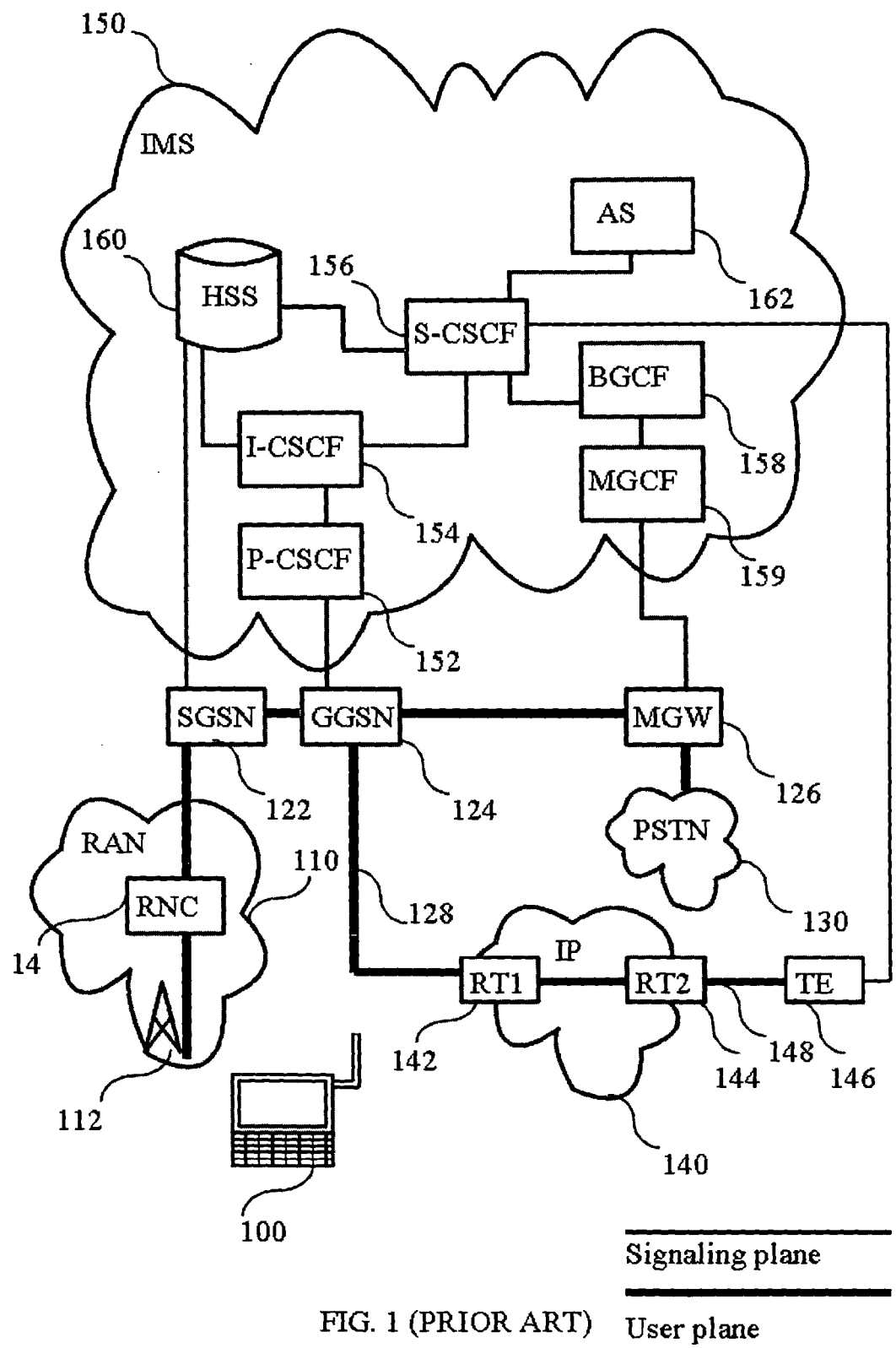
FIG. 1 is a block diagram illustrating a Universal Mobile Telecommunications System (UMTS) in prior art.
Figure 2:
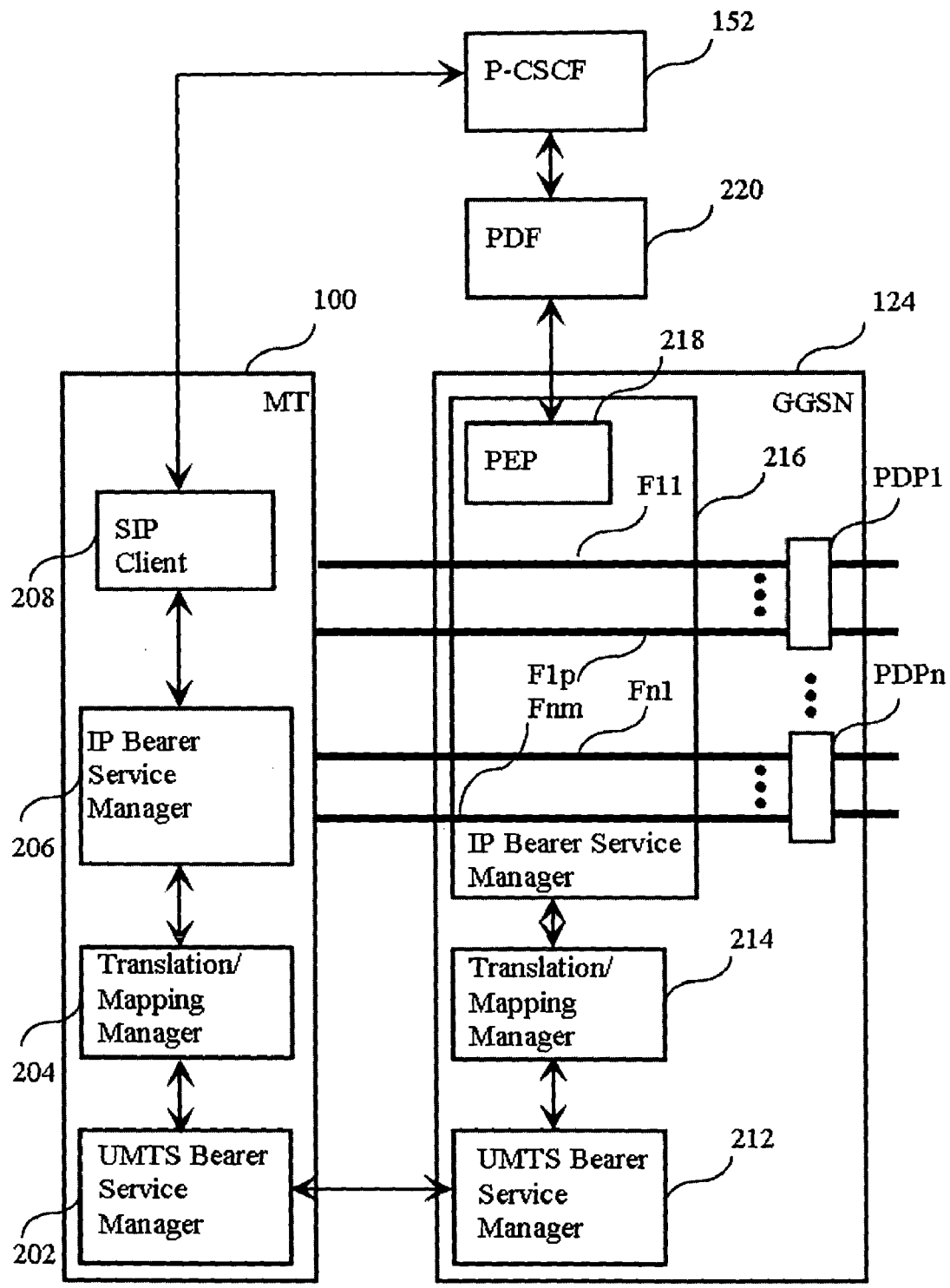
FIG. 2 is a block diagram illustrating a binding mechanism in association with the Quality of Service (QoS) authorization for Packet Data Protocol (PDP) contexts in prior art.
Figure 3:
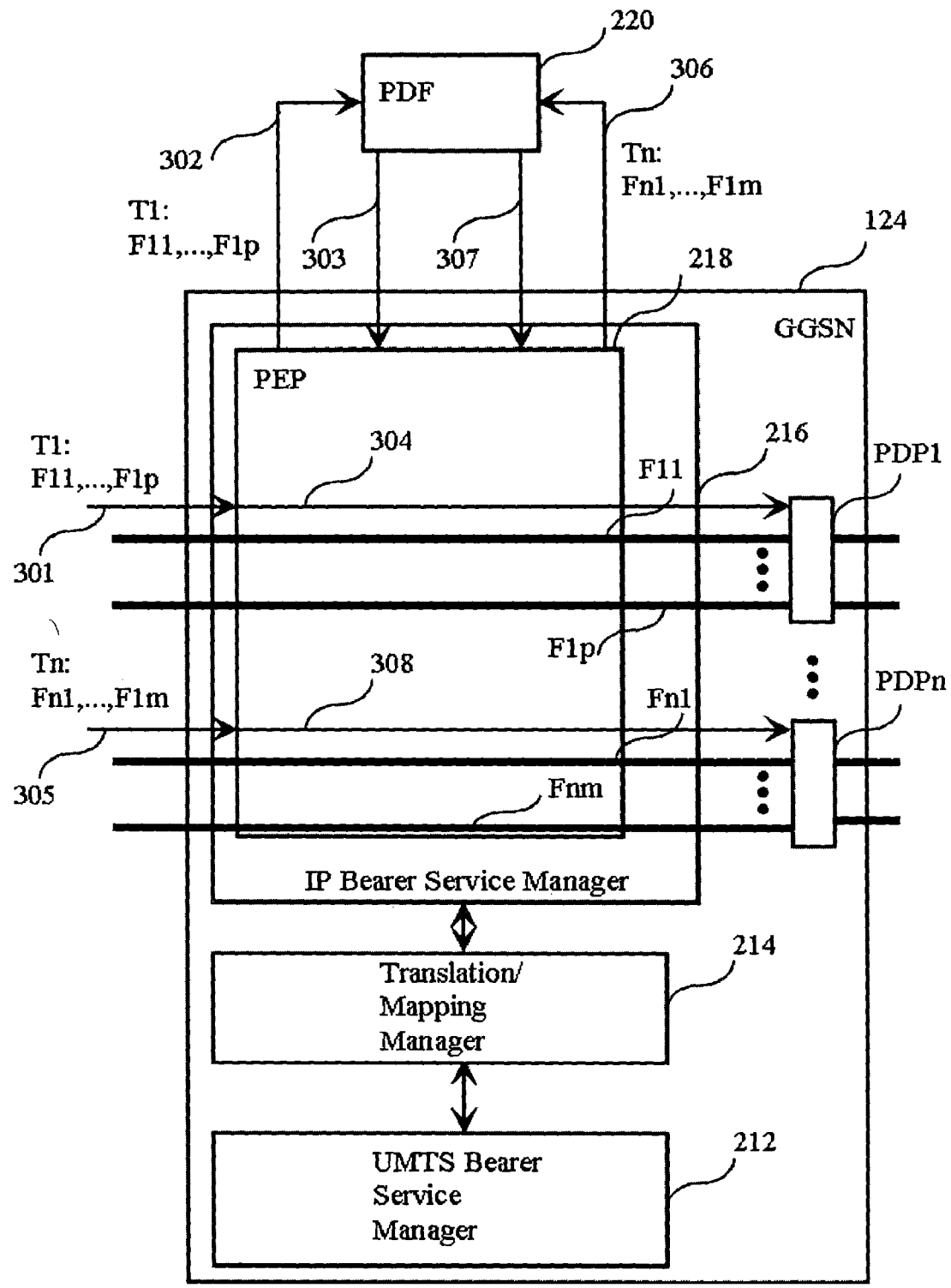
FIG. 3 is a block diagram illustrating Quality of Service (QoS) authorization signaling in prior art.
Figure 4A:
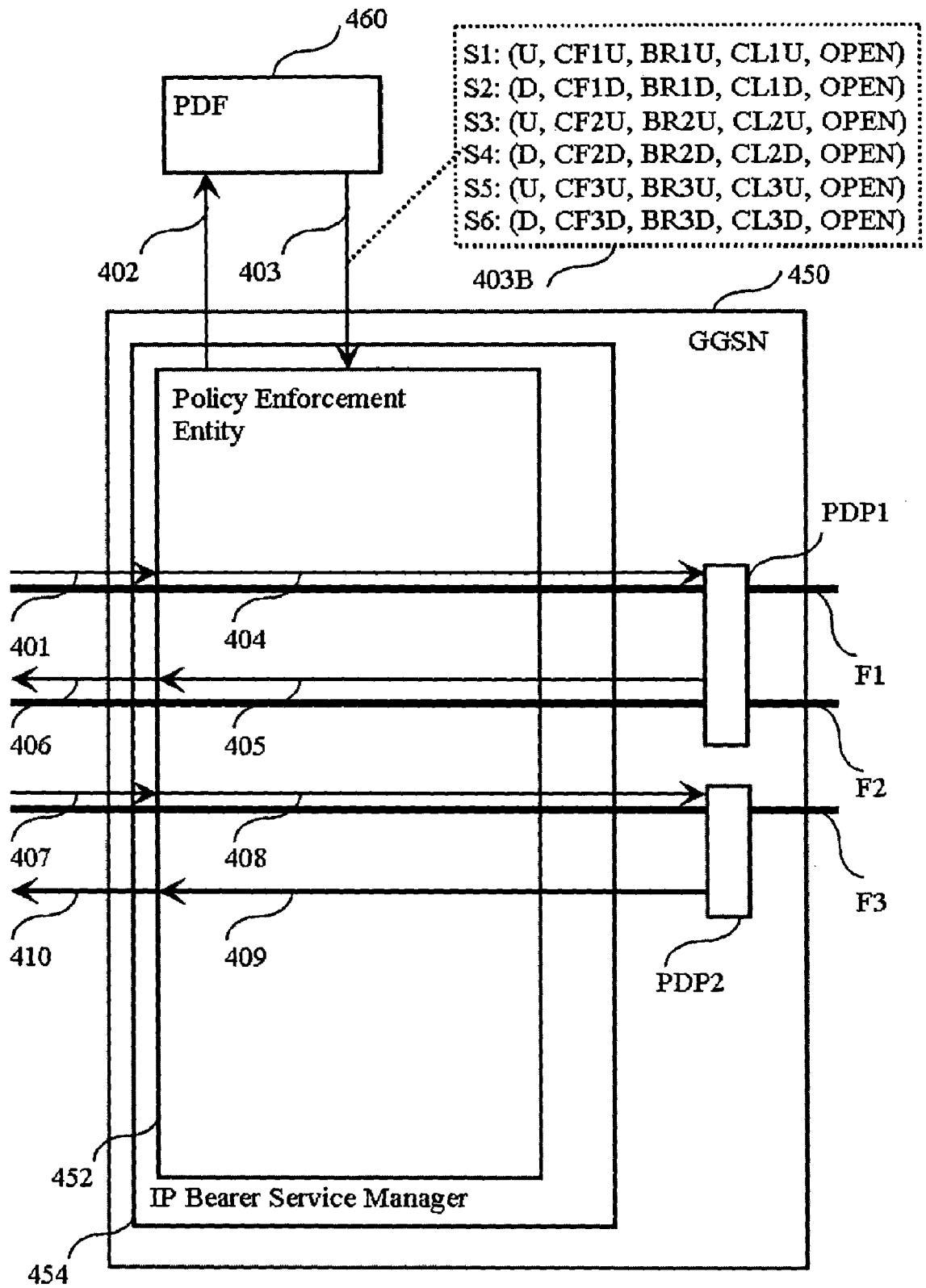
FIG. 4A is a block diagram illustrating Quality of Service (QoS) authorization signaling at Packet Data Protocol (PDP) context establishment phase in one embodiment of the invention.

FIG. 4A is a block diagram illustrating Quality of Service (QoS) authorization signaling at Packet Data Protocol (PDP) context establishment phase in one embodiment of the invention. In FIG. 4A there is a Gateway GPRS Support Node (GGSN) 450 and a Policy Decision Function (PDF) 460. A mobile station (not shown) communicates with GGSN 450. Within GGSN 450 there is a Policy Enforcement Entity 452, which is comprised in IP Bearer Service Manager 452. The starting point in FIG. 4A is that the mobile station (not shown) has exchanged SIP signaling information with a remote terminal. The signaling information has been intercepted in PDF 460, which has determined from the session description protocol definitions the IP flows and the bi-directional combinations of these IP flows that are associated with the session. There are three bi-directional combinations of IP flows, namely combinations F1, F2 and F3. PDF 460 may be an entity within a Proxy Call State Control Function (P-CSCF) or it may be a separate network node, which communicates with a P-CSCF. PDF 460 does not know the mapping of the flows to secondary PDP contexts. The primary PDP context is not shown. In one embodiment of the invention, in place of the P-CSCF may be used a general Application Function (AF), which obtains the flow information via an application protocol different from the SIP. The application protocol may be any protocol for the establishment of communications between any given network nodes. In such a case the flows may carry as well conversational, streaming, interactive packet or background traffic.

The mobile station starts establishing secondary PDP contexts for the flows. The first secondary PDP context PDP1 is established using PDP context activation signaling messages illustrated with arrows 401, 404, 405 and 406. A PDP context activation message also comprises QoS parameters for the bearer, that is, the PDP context. The QoS parameters comprise, for example, the maximum uplink and downlink bitrates and the traffic class as specified 3GPP specification 24.008. After the receiving of the PDP context activation message illustrated with arrow 401, Policy Enforcement Entity 452 takes contact to PDF 460 and provides a request message, which is illustrated with arrow 402. The request message comprises an IP address of the mobile station or user identification associated with the user, for which a session or a group of sessions is being established. The session or the group of sessions contains at least one media component that will be carried over PDP context PDP1. The user identification may, for example, be a SIP URI. The binding disclosed herein is performed to obtain a policy decision for the PDP contexts associated with the session or the group of sessions associated with the user or the mobile station. Request message 402 also comprises at least part of the QoS parameters associated with the PDP context that were received in PDP context activation message 401. The PDF 460 implements the authorization of the QoS parameters according to the session information received from the P-CSCF and checks the bit rate or bandwidth values requested by the GGSN 450 in the authorization requests. If the sum of the values of the given mobile station or user exceeds the aggregate authorized value, the GGSN 450 downgrades or rejects the request.

In response to the request message illustrated with arrow 402, PDF 460 provides a decision message comprising an install command as illustrated with arrow 403. Some parameters associated with the install command are shown in box 403B. The install command may contain aggregate values for QoS parameters, for example, an aggregate bit rate for the user, or QoS values for each IP flow of the user. In this example IP flow based values are available, the bi-directional combinations of IP flows being F1, F2 and F3. For bi-directional combination F1 the gate descriptions are S1 and S2. Gate description S1 comprises a direction indicator U designating uplink, a classifier CF1U for uplink pertaining to bi-directional combination F1, a data rate i.e. bitrate parameter BR1U, a maximum QoS class parameter CL1U and a gate status with the value open. Gate description S2 comprises a direction indicator D designating downlink, a classifier CF1D for downlink pertaining to bi-directional combination F1, a data rate parameter BR1D, a maximum QoS class parameter CL1D and a gate status with the value open. The maximum QoS class parameters CL1U and CL2D must agree. For bi-directional combinations F2 and F3 the gate descriptions are S3&S4 and S5&S6, respectively. The parameters are similar in gate descriptions S3-S6. Throughout box 403B, the letter "D" designates a parameter for downlink and "U" a parameter for uplink. It is assumed that the packet handling action, that is, the gate status, associated with these packet classifiers is open. Whenever there is a need to suspend the uplink IP flow or the downlink IP flow within one of these bi-directional combinations, PDF 460 may issue a subsequent decision message containing an install command, which alters the gate status to become closed and the IP flow is suspended in GGSN 450. In message 403 the IP flows are not mapped to any particular secondary PDP context. The IP flows are provided whenever they are enquired from PDF 460. In order to optimize signaling traffic, GGSN 450 does not enquire these parameters again in association with the opening the subsequent secondary PDP contexts. In FIG. 4A this means that in association with the activation of PDP context PDP2 no enquiry is made to PDF 460. The activation of secondary PDP context PDP2 is illustrated with arrows 407, 408, 409 and 410. It should be noted that the user/mobile terminal may have several simultaneous sessions and flows from separate sessions may be multiplexed in the same PDP context.

Figure 4B:
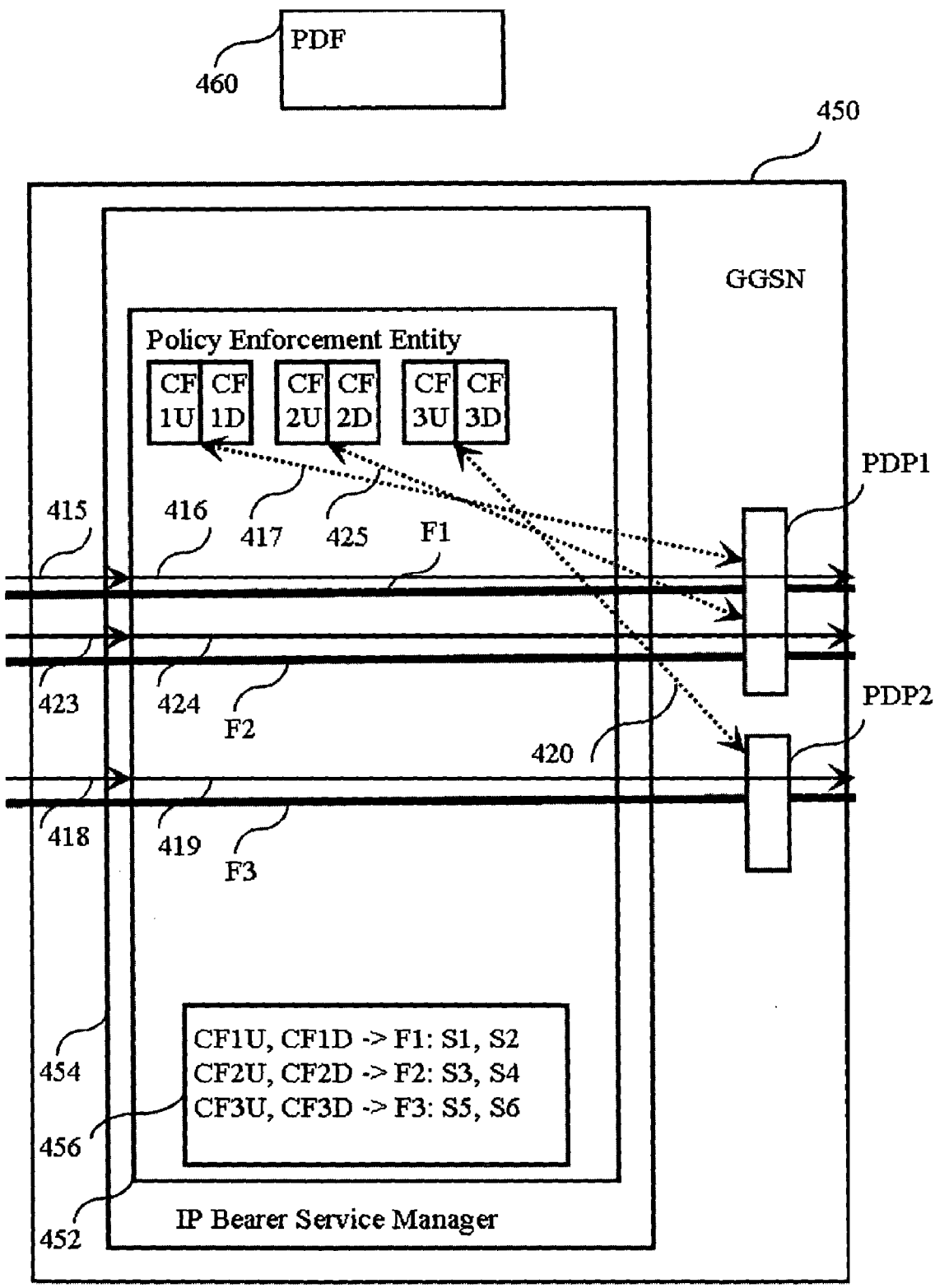
FIG. 4B is a block diagram illustrating Quality of Service (QoS) authorization signaling at packet receiving phase in one embodiment of the invention.

FIG. 4B is a block diagram illustrating Quality of Service (QoS) authorization signaling at packet receiving phase in one embodiment of the invention. In FIG. 4B the PDP contexts have been activated as illustrated in FIG. 4A. A PDF 460 has already provided to a GGSN 450 and a Policy Enforcement Entity 452, the packet classifiers as they were provided in message 403. The association of packet classifiers to the gate descriptions and the bi-directional combinations of these gate descriptions and thus IP flows is illustrated in box 456. However, such an explicit mapping may not exist in an actual implementation. The starting point in FIG. 4B is that GGSN 450 and Policy Enforcement Entity 452 do not know the mapping of the flows to the PDP contexts. This mapping has to be learned by Policy Enforcement Entity 452. The mapping is referred in other words as binding. The Policy Enforcement Entity 452 in the network that sets up the packet filters according to the information received from the PDF monitors the traffic through the packet filters. Note that the same filters will have to be set up for all PDP contexts in the beginning, because due to the used binding mechanism the network does not know at the session establishment, which PDP context the mobile station is using for given IP flows. The mobile station sends an IP packet in the PDP context PDP1 as illustrated with arrow 415. From the IP packet header Policy Enforcement Entity 452 determines that the packet is associated, that is it matches, classifier CF1U. Policy Enforcement Entity 452 passes the packet through the relevant filter. Now the GGSN knows that this filter and the relevant downlink filter CF1D belong to this PDP context. In other words, the GGSN knows that the bi-directional combination F1 belongs to the PDP context PDP1. The GGSN can remove or close the same filters from the other PDP contexts of the relevant user/mobile station. The mapping between PDP1 and flow F1 is illustrated with arrow 417. As illustrated with arrow 416 the IP packet is provided via PDP1 further towards a subsequent router.

Later a second IP packet, as illustrated with arrow 418, is sent to Policy Enforcement Entity 452 in the PDP context PDP2. Policy Enforcement Entity 452 determines from the packet headers that the IP packet matches the classifier CF3U for the uplink IP flow of bi-directional combination F3. Therefore, a mapping between PDP2 and flow F3 is established, as illustrated with arrow 420. The second IP packet is sent for routing to a further router as illustrated with arrow 419. A third IP packet as illustrated with arrow 423 is received to policy enforcement entity 452 in PDP context PDP1 from the mobile station. The IP address in the packet header for the third IP packet matches the uplink classifier CF2U for the uplink IP flow of bi-directional combination F2. This means that, as the packet was received associated with secondary PDP context PDP1, an association with secondary PDP context PDP1 and bi-directional combination F2 must be established, as illustrated with arrow 425. The packet is set for further routing, as illustrated with arrow 424. It should be noted that as soon as a packet is received, which matches the classifier for one of the IP flows of a bi-directional combination, it is then thereafter possible to eliminate the IP flows of that bi-directional combination from all the other PDP contexts that have not received the packet. The end result is that as an uplink or downlink packet has been received pertaining to a flow it is possible to eliminate that flow form other PDP contexts. Finally, each uplink flow handled this way and the related downlink flow(s) have filters, that is, packet classifiers active only in one PDP context.

Based on the updated filters obtained as described above (i.e. each filter or uplink/downlink filter pair is active or exists only in one PDP context), the GGSN can check the authorized bitrate/bandwidth for each PDP context. The bitrates/bandwidths of all media streams/filters of the PDP context are summed, separately for uplink and downlink. If the mobile station has requested and has been allocated a too high bitrate/bandwidth for a PDP context, the value can be downgraded or the PDP context can be deleted.

Based on the updated filters obtained as described above i.e. each filter or filter pair is active or exists only in one PDP context, the GGSN can check the authorized QoS Class for each PDP context. If the UE has requested and has been allocated a too high QoS Class for a PDP context, the value can be downgraded or the PDP context can be deleted.

Software components, that is, Policy Enforcement Entity 452, IP bearer service manager entity 454, the translation/mapping manager entities and the UMTS bearer service manager entities may be implemented in various ways. They may be implemented as processes executed under the native operating system. The software entities may be implemented as separate processes or so that a number of different software entities is implemented by means of one process. Some software entities may be implemented as modules linked to another entity. The entities may be executed in separate computer units, which communicate via a message bus or a network. A computer unit comprises as its components, for example, a processor, a random access memory, a secondary memory such as a magnetic or optical disk or a flash memory card and a communication interface. A computer unit may be comprised in a blade server or in a rack system together with other computer units. A computer unit may also, for example, be a desktop computer, workstation or a portable computer. In one embodiment of the invention, a set of computer units may be used together to form a part of a network element, for example, GGSN 450 or PDF 460. In one embodiment of the invention, a single computer, that is, a computer unit may also provide a network element such as GGSN 450 or PDF 460.

Figure 5:
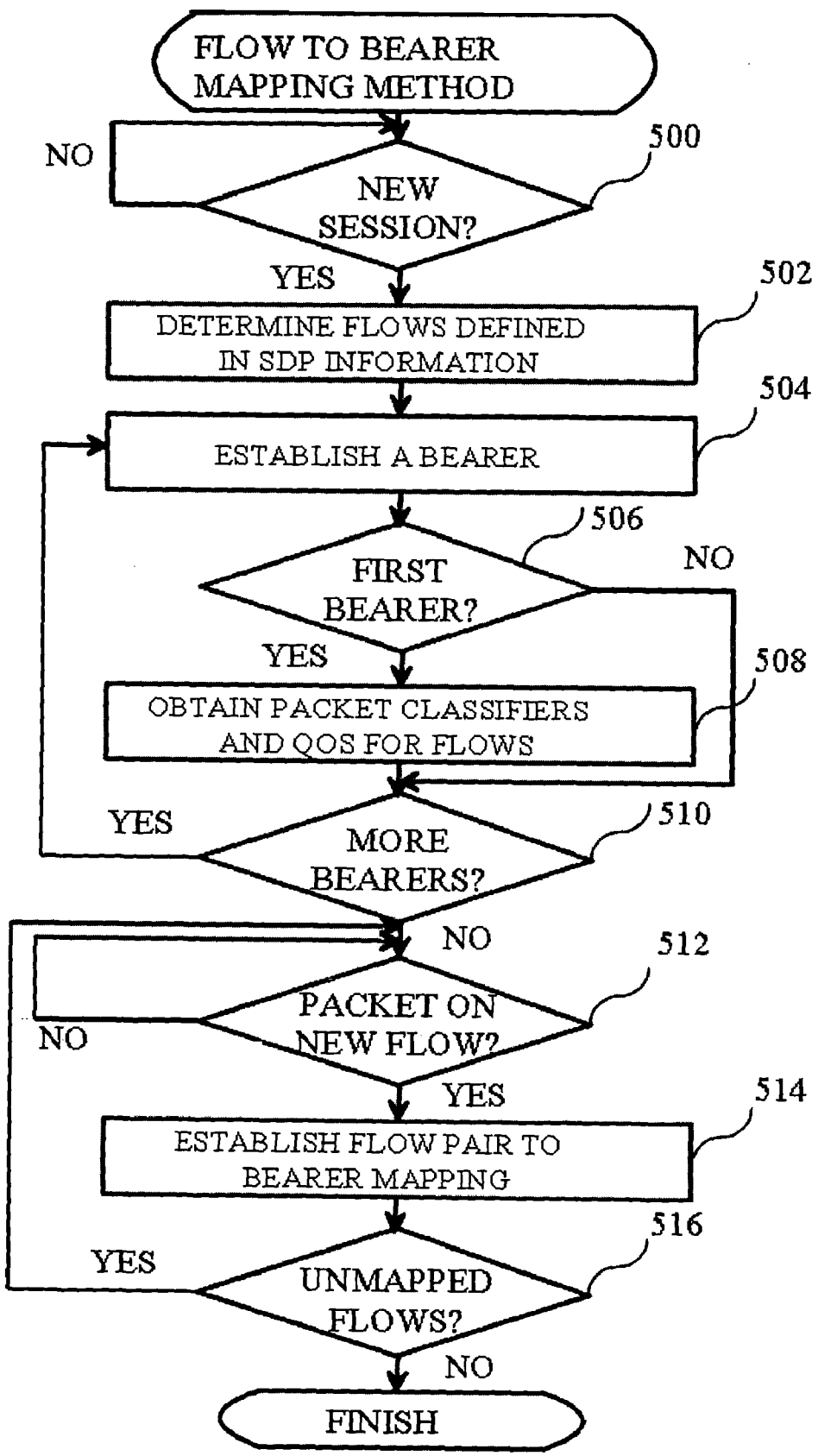
FIG. 5 is a flow chart illustrating a method for the binding of packet flows to bearers in one embodiment of the invention.

FIG. 5 is a flow chart illustrating a method for the mapping of packet flows to bearers in one embodiment of the invention. The example in FIG. 5 describes a limited case where the user establishes a single new session. Other cases, where the present invention is applicable, but where FIG. 5 is not valid, would be for example an update of an existing session with new flows, or a case where flows from several simultaneous sessions are multiplexed in the same PDP context. At step 500 it is determined in a Policy Decision Function (PDF) whether a new session is observed. If a new session is not observed, the method continues at step 500. If a new session is observed and the session description protocol definition is received to the PDF, the PDF determines the flows and their pairs defined in the SDP information. At step 504 the terminal establishes a bearer with a network node. At step 506 the network node determines whether this is a first bearer for user plane data traffic between the terminal and the network node. If it is not a first bearer, then the method continues at step 510. Otherwise the method continues at step 508. At step 508 the network node obtains packet classifiers and QoS parameters for the flows from the PDF. At step 510 it is determined whether more bearers are needed for the session. This determination is performed either in the terminal or in the network node. If more bearers are required, the method continues at step 504. At step 512 the network node determines whether a packet has been received that matches a new pair of flows on which a packet has not previously been received. The pair of flows comprises an uplink and a downlink flow. If a packet on a new pair of flows is received, the method continues at step 514, otherwise the method continues at step 512. At step 514 the network node determines from the packet headers the flow, with which the packet is associated. The determination uses packet classifiers associated with the flow. The determination also checks, what the bearer is, from which the IP packet has been received. By determining the matching flow and the bearer, from which the packet was received, it is possible to determine a mapping between the aforementioned bearer and the pair of flows. As the mapping is determined both flows in the pair can be removed from all other bearers. At step 516 it is determined whether there are still remaining flows, which have not been mapped to any given bearer. If this is the case, the method continues to step 512. Otherwise the method is finished.

It is obvious to a person skilled in the art, that with the advancement of technology, the basic idea of the invention may be implemented in various ways. The invention and its embodiments are thus not limited to the examples described above; instead they may vary within the scope of the claims.

The invention claimed is:
1. A method, comprising:
receiving at a first network node a first bearer creation request;
obtaining to said first network node, from a remote network node, a plurality of gate descriptions in response to said first bearer creation request, said plurality of gate descriptions comprising at least two bi-directional gate description combinations comprising an uplink gate description and a downlink gate description, said bi-directional gate description combinations being associated with at least two packet flows;
establishing said first bearer to said first network node;
receiving a packet associated with said first bearer in said first network node;
matching said packet with at least one of said plurality of gate descriptions to determine a first bi-directional gate description combination;
establishing a mapping between said first bi-directional gate description combination and said first bearer in said first network node, in response to said matching;
receiving at said first network node a second bearer creation request;
establishing said second bearer to said first network node;
receiving a second packet associated with said second bearer in said first network node;
matching said second packet with at least one of said plurality of gate descriptions to determine a second bi-directional gate description combination; and
establishing a mapping between said second bi-directional gate description combination and said second bearer in said first network node.

2. The method according to claim 1, the method further comprising:
- receiving a requested uplink bitrate and a requested downlink bitrate for said first bearer;
- receiving a maximum bitrate for each of said at least two packet flows from said remote network node;
- summing, for said first bearer, maximum bitrates of the uplink gate descriptions in the bi-directional gate description combinations mapped to said first bearer to obtain an uplink combined bitrate;
- summing, for the first bearer, maximum bitrates of the downlink gate descriptions in the bi-directional gate description combinations mapped to said first bearer to obtain a downlink combined bitrate; and
- comparing said uplink combined bitrate to said requested uplink bitrate and said downlink combined bitrate to said requested downlink bitrate.

3. The method according to claim 2, the method further comprising:
- removing said first bearer when said requested uplink bitrate exceeds said uplink combined bitrate or said requested downlink bitrate exceeds said downlink combined bitrate.

4. The method according to claim 2, the method further comprising:
- downgrading the downlink bitrate of said first bearer when said requested downlink bitrate exceeds said downlink combined bitrate; and
- downgrading the uplink bitrate of said first bearer when said requested uplink bitrate exceeds said uplink combined bitrate.

5. The method according to claim 1, the method further comprising:
- receiving from said terminal a requested quality of service class for the first bearer;
- receiving a maximum quality of service class for each of said at least two packet flows from said remote network node; and
- checking that the requested quality of service class does not exceed any of the maximum quality of service classes provided for said first bearer.

6. The method according to claim 5, the method further comprising:
- removing said first bearer when the requested quality of service class exceeds any of the maximum quality of service classes provided for said first bearer.

7. The method according to claim 5, the method further comprising:
- downgrading the quality of service class of said first bearer when the requested quality of service class exceeds any of the maximum quality of service classes provided for said first bearer.

8. The method according to claim 5, wherein said quality of service class comprises at least one of a conversational class, a streaming class, an interactive class and a background class.

9. The method according to claim 5, wherein said terminal comprises a mobile station.

10. The method according to claim 5, wherein the method is performed by a Gateway GPRS Support Node.

11. The method according to claim 1, the method further comprising:
- obtaining from said remote network node a first service class for each of said plurality of gate descriptions; and
- determining a second service class for said first bearer and said second bearer based on said mapping and said first service classes.

12. The method according to claim 1, the method further comprising:
- obtaining from said remote network node a first data rate associated with a combination of said at least two packet flows;
- comparing a sum of the data rates of said first bearer and said second bearer to said first data rate; and
- reducing the data rate of at least one bearer among said first bearer and said second bearer when the sum of the data rates of said at least two bearers exceeds said first data rate.

13. The method according to claim 1, the method further comprising:
- receiving said information about said session and said at least two packet flows in a third network node in at least one session establishment signaling message; and
- providing said information about said session and said at least two packet flows to the remote network node.

14. The method according to claim 13, wherein said third network node comprises a Session Initiation Protocol (SIP) proxy.

15. The method according to claim 1, wherein the method is performed by a router.

16. The method according to claim 1, wherein said communication system comprises a mobile communication network.

17. The method according to claim 1, wherein said at least said first bearer and said second bearer are Packet Data Protocol (PDP) Contexts.

18. The method according to claim 1, wherein said second network node comprises a policy decision point.

19. The method according to claim 1, wherein said establishing at least one bearer further comprises establishing at least one connection segment to a connected state, said at least one connection segment of at least two connection segments providing said at least one bearer.

20. A system, the system comprising:
- a terminal configured to initiate an establishment of a session with a remote terminal, to agree to the establishment of a first bearer and a second bearer with a first network node, and to establish said first bearer and said second bearer;
- the first network node configured to receive a first bearer creation request, to obtain, from a second network node, a plurality of gate descriptions in response to said first bearer creation request, said plurality of gate descriptions comprising at least two bi-directional gate description combinations comprising an uplink gate description and a downlink gate description, said bi-directional gate description combinations being associated with at least two packet flows, to establish said first bearer, to receive a packet associated with said first bearer, to match said packet with at least one of said plurality of gate descriptions to determine a first bi-directional gate description combination, to establish a mapping between said first bi-directional gate description combination and said first bearer, in response to said matching, to receive a second bearer creation request, to establish said second bearer, to receive a second packet associated with said second bearer, to match said second packet with at least one of said plurality of gate descriptions to determine a second bi-directional gate description combination, and to establish a mapping between said second bi-directional gate description combination and said second bearer; and the second network node configured to receive information about said session and said at least two packet flows, and to provide a packet classifier for each said at least two packet flows.

21. A non-transitory computer readable medium encoded with code configured to cause a processor to perform a process, the process comprising:
   receiving a first bearer creation request;
   obtaining, from a remote network node, a plurality of gate descriptions in response to said first bearer creation request, said plurality of gate descriptions comprising at least two bi-directional gate description combinations comprising an uplink gate description and a downlink gate description, said bi-directional gate description combinations being associated with at least two packet flows;
   establishing said first bearer;
   receiving a packet associated with said first bearer;
   matching said packet with at least one of said plurality of gate descriptions to determine a first bi-directional gate description combination;
   establishing a mapping between said first bi-directional gate description combination and said first bearer, in response to said matching;
   receiving a second bearer creation request;
   establishing said second bearer;
   receiving a second packet associated with said second bearer;
   matching said second packet with at least one of said plurality of gate descriptions to determine a second bi-directional gate description combination; and
   establishing a mapping between said second bi-directional gate description combination and said second bearer.

22. The computer readable medium according to claim 21, wherein said computer readable medium is a removable memory card.

23. The computer readable medium according to claim 21, wherein said computer readable medium is a magnetic or an optical disk.

24. An apparatus, comprising:
   at least one memory including computer program code;
   at least one processor,
   wherein the at least one memory and the computer program code are configured to, with the at least one processor, cause the apparatus at least to
   receive a first bearer creation request;
   obtain, from a remote network node, a plurality of gate descriptions in response to said first bearer creation request, said plurality of gate descriptions comprising at least two bi-directional gate description combinations comprising an uplink gate description and a downlink gate description, said bi-directional gate description combinations being associated with at least two packet flows;
   establish said first bearer;
   receive a packet associated with said first bearer;
   match said packet with at least one of said plurality of gate descriptions to determine a first bi-directional gate description combination;
   establish a mapping between said first bi-directional gate description combination and said first bearer, in response to said matching;
   receive a second bearer creation request;
   establish said second bearer;
   receive a second packet associated with said second bearer;
   match said second packet with at least one of said plurality of gate descriptions to determine a second bi-directional gate description combination; and
   establish a mapping between said second bi-directional gate description combination and said second bearer.

25. The apparatus according to claim 24, wherein the at least one memory and the computer program code are also configured to, with the at least one processor, cause the apparatus at least to
   receive a requested uplink bitrate and a requested downlink bitrate for the first bearer;
   receive a maximum bitrate for each of said at least two packet flows from said remote network node;
   sum for said first bearer among said at least two bearers, maximum bitrates of the uplink packet flows in the packet flow pairs mapped to said first bearer to obtain an uplink combined bitrate;
   sum, for the first bearer, maximum bitrates of the downlink packet flows in the packet flow pairs mapped to said first bearer to obtain a downlink combined bitrate; and
   compare said uplink combined bitrate to said requested uplink bitrate and said downlink combined bitrate to said requested downlink bitrate.

26. The apparatus according to claim 25, wherein the at least one memory and the computer program code are also configured to, with the at least one processor, cause the apparatus at least to remove said first bearer when said requested uplink bitrate exceeds said uplink combined bitrate or said requested downlink bitrate exceeds said downlink combined bitrate.

27. The apparatus according to claim 25, wherein the at least one memory and the computer program code are also configured to, with the at least one processor, cause the apparatus at least to
   downgrade the downlink bitrate of said first bearer when said requested downlink bitrate exceeds said downlink combined bitrate; and
   downgrade the uplink bitrate of said first bearer when said requested uplink bitrate exceeds said uplink combined bitrate.

28. The apparatus according to claim 24, wherein the at least one memory and the computer program code are also configured to, with the at least one processor, cause the apparatus at least to
   receive from said terminal a requested quality of service class for a said first bearer;
   receive a maximum quality of service class for each of said at least two packet flows from said remote network node by said first network node; and
   check in said first network node that the requested quality of service class does not exceed any of the maximum quality of service classes provided for said first bearer.

29. The apparatus according to claim 28, wherein the at least one memory and the computer program code are also configured to, with the at least one processor, cause the apparatus at least to remove said first bearer when the requested quality of service class exceeds any of the maximum quality of service classes provided for said first bearer.

30. The apparatus according to claim 28, wherein the at least one memory and the computer program code are also configured to, with the at least one processor, cause the apparatus at least to downgrade the quality of service class of said first bearer when the requested quality of service class exceeds any of the maximum quality of service classes provided for said first bearer.

31. The apparatus according to claim 28, wherein said quality of service class comprises at least one of a conversational class, a streaming class, an interactive class and a background class.

32. The apparatus according to claim 28, wherein said apparatus comprises a Gateway GPRS Support Node.

33. The apparatus according to claim 24, wherein said at first bearer and said second bearer are Packet Data Protocol (PDP) Contexts.

34. The apparatus according to claim 24, wherein the at least one memory and the computer program code are also configured to, with the at least one processor, cause the apparatus at least to
obtain from said second network node a first service class for each of said at least two packet flows; and
determine a second service class for each of said first bearer and said second bearer based on said mapping and said first service classes.

35. The apparatus according to claim 24, wherein the at least one memory and the computer program code are also configured to, with the at least one processor, cause the apparatus at least to obtain from said second network node a first data rate associated with a combination of said at least two packet flows;
compare a sum of the data rates of said first bearer and said second bearer to said first data rate; and
reduce the data rate of at least one bearer among said first bearer and said second bearer when the sum of the data rates of said first bearer and said second bearer exceeds said first data rate.

36. The apparatus according to claim 24, wherein said apparatus comprises a router.

37. The apparatus according to claim 24, wherein the at least one memory and the computer program code are also configured to, with the at least one processor, cause the apparatus at least to establish at least one connection segment to a connected state, said at least one connection segment of at least two connection segments providing said at least one bearer.

* * * * *